United States Patent
Huang et al.

(10) Patent No.: US 10,647,218 B1
(45) Date of Patent: May 12, 2020

(54) SYSTEM FOR THERMALLY CONDITIONING A BATTERY PACK OF AN ELECTRIC VEHICLE

(71) Applicant: Bordrin New Energy Vehicle Corporation, Inc., Royal Oak, MI (US)

(72) Inventors: Clay Huang, Troy, MI (US); Yonghua Li, Ann Arbor, MI (US)

(73) Assignee: Bordin New Energy Vehicle Corporation, Inc., Royal Oak, MI (US)

( * ) Notice: Subject to any disclaimer, the term of this patent is extended or adjusted under 35 U.S.C. 154(b) by 0 days.

(21) Appl. No.: 16/383,567

(22) Filed: Apr. 12, 2019

(51) Int. Cl.
| | |
|---|---|
| *H01M 10/46* | (2006.01) |
| *B60L 53/62* | (2019.01) |
| *H01M 10/48* | (2006.01) |
| *H01M 10/617* | (2014.01) |
| *B60L 58/24* | (2019.01) |
| *H01M 10/625* | (2014.01) |

(52) U.S. Cl.
CPC .............. *B60L 53/62* (2019.02); *B60L 58/24* (2019.02); *H01M 10/486* (2013.01); *H01M 10/617* (2015.04); *H01M 10/625* (2015.04)

(58) Field of Classification Search
CPC .. B60L 11/1874; B60L 11/1809; B60L 11/18; B60L 53/62; B60L 58/24; B60K 6/28; H01M 10/617; H01M 10/625; H01M 10/486; H01M 10/613; H01M 10/633
USPC ....................................................... 320/109
See application file for complete search history.

(56) References Cited

U.S. PATENT DOCUMENTS

| | | | | |
|---|---|---|---|---|
| 2012/0191242 A1* | 7/2012 | Outwater | ............... | G06Q 30/06 700/236 |
| 2013/0335025 A1* | 12/2013 | Kuribayashi | ........... | B60L 53/68 320/109 |
| 2013/0335032 A1* | 12/2013 | Kuribayashi | ........... | B60L 53/11 320/137 |
| 2015/0069970 A1* | 3/2015 | Sarkar | ..................... | B60L 53/55 320/109 |
| 2015/0149015 A1* | 5/2015 | Nakano | ............... | B60L 11/1861 701/22 |
| 2016/0185246 A1* | 6/2016 | Paul | ..................... | B60L 11/1844 320/106 |
| 2016/0275400 A1* | 9/2016 | Hodges | ..................... | G06N 5/04 |
| 2016/0303990 A1* | 10/2016 | Penilla | ................... | G06Q 20/18 |

(Continued)

*Primary Examiner* — Edward Tso
*Assistant Examiner* — Dung V Bui
(74) *Attorney, Agent, or Firm* — Brinks Gilson & Lione

(57) ABSTRACT

A system for thermally conditioning a battery pack of an electric vehicle includes at least one battery pack mounted within the electric vehicle having at least one cell; circuitry in that determines a battery total charge of the at least one battery pack, a thermal conditioning system in thermal communication with the at least one battery pack system configured to heat or cool the at least one cell of the at least one battery pack, a vehicle positioning system in communication configured to determine a location of the electric vehicle, and a map database. The circuitry is configured to determine when the battery total charge of the at least one battery pack should be charged, determine, when the electric vehicle is traveling, a travel time between the electric vehicle and the one or more charging stations, and instruct the thermal conditioning system to thermally condition the at least one battery pack based on the travel time to reduce the time needed to charge the at least one battery pack.

15 Claims, 3 Drawing Sheets

(56) References Cited

U.S. PATENT DOCUMENTS

2017/0217319 A1* 8/2017 Araki ................. G06Q 30/0282
2018/0304765 A1* 10/2018 Newman ............. H01M 10/446

* cited by examiner

SYSTEM FOR THERMALLY CONDITIONING A BATTERY PACK OF AN ELECTRIC VEHICLE

BACKGROUND

1. Field of the Invention

The present invention generally relates to systems and methodologies for thermally conditioning a battery pack of an electric vehicle.

2. Description of Related Art

Traditionally, automobiles and trucks relied on the use of engines to provide power to one or more wheels of the automobile or truck. Many of these engines are a type of internal combustion engine, wherein a combustible liquid or gas is supplied to a piston chamber that, when ignited by either a spark plug or by pressure from a moving piston, provides an explosion that in turn provides a force to the piston to move the piston. This movement of the piston causes the rotation of an output shaft that is connected to the powertrain of the vehicle. This powertrain then provides the received power to one or more wheels.

The combustible liquid or gas is stored in an onboard fuel tank. As the combustible liquid or gas is consumed by the engine, the fuel tank must eventually be replenished. Generally, this replenishment of the fuel tank takes only a matter of minutes.

Fully electric vehicles and partially electric vehicles utilize an electric motor. An electric motor is an electrical machine that converts electrical energy into mechanical energy. Most electric motors operate through the interaction between the motor's magnetic field and winding currents to generate force in the form of rotation. Electric motors utilized in vehicles are generally powered by at least one rechargeable battery pack having a plurality of cells.

Electric vehicles have certain advantages over vehicles that rely on an engine that consumes a combustible liquid or gas. Vehicles that have engines have complex engines and powertrains required to generate and transmit power to the wheels. Electric vehicles, on the other hand, generally have much simpler powertrain requirements because the electric motor can provide an appropriate amount of power without the need for complex powertrain components. Additionally, electric vehicles, unlike vehicles that rely on the use of the combustible liquid or gas, do not output carbon dioxide and/or other pollutants to the atmosphere.

However, one drawback of electric vehicles involves the recharging of the at least one battery pack. The time it takes to recharge the battery pack of an electric vehicle depends on numerous factors, including the type of charger being utilized, the age of the battery pack, the temperature of the battery pack, among others. Generally, the time it takes to fully recharge or even partially recharge the battery pack of an electric vehicle is significantly longer than it takes to refill a fuel tank of a vehicle that utilizes a more traditional engine.

SUMMARY

A system for thermally conditioning a battery pack of an electric vehicle includes at least one battery pack mounted within the electric vehicle having at least one cell, circuitry configured to determine a battery total charge of the at least one battery pack, a thermal conditioning system in thermal communication with the at least one battery pack system configured to heat or cool the at least one cell of the at least one battery pack, a vehicle positioning system in communication configures to determine a location of the electric vehicle, and a map database.

The circuitry is configured to determine when the battery total charge of the at least one battery pack is too low so it should be charged, determine a travel time between the electric vehicle and the one or more charging stations while the electric vehicle is traveling, and instruct the thermal conditioning system to thermally condition the at least one battery pack based on the travel time to a charging station to increase the charging speed of the at least one battery pack, thus reducing the time needed to charge the at least one battery pack. The charging speed is essentially the time in which it takes to charge the battery pack. The purpose of the optimization of the charge time is to shorten the total charge time while maintaining allowable charge current level.

Further objects, features, and advantages of this invention will become readily apparent to persons skilled in the art after a review of the following description, with reference to the drawings and claims that are appended to and form a part of this specification.

DETAILED DESCRIPTION

Figure 1:
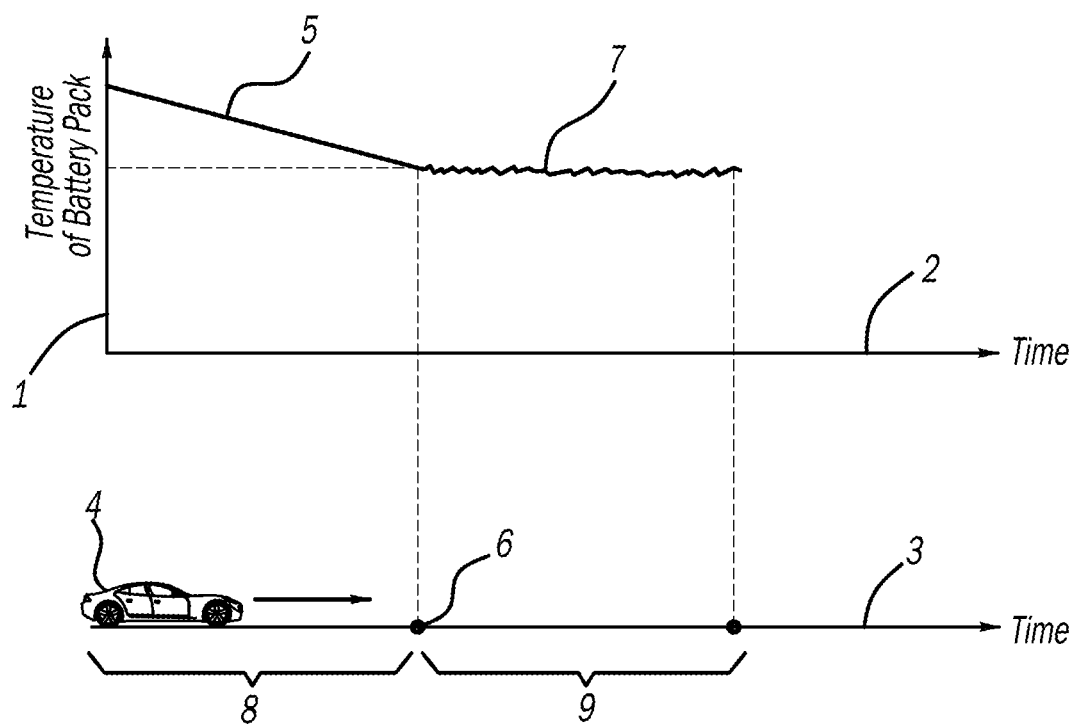
FIG. 1 illustrates charts that explain the functionality of the system for thermally conditioning the battery pack of a vehicle.

FIG. 1 illustrates two charts. The first chart has a y-axis 1 that is indicative of the temperature of a battery pack of a vehicle and an x-axis 2 that indicates time. As such, the first chart shows the temperature of the battery pack of a vehicle over time.

The second chart includes an x-axis 3 that is representative of time. The time represented by the x-axis 3 of this chart matches the time represented by x-axis 2 of the first chart. As such, events occurring at times represented in the second chart, match times of events represented in the first chart.

The second chart illustrates a vehicle 4. A time duration 8 represents a travel time of the vehicle 4 to a charging station, such as a fast charging station. The vehicle 4 reaches the fast charging station at point 6. A time duration 9 represents the time duration for charging the battery pack of the vehicle 4 once it has reached the charging station at point 6.

When comparing the first graph to the second graph, it can be seen that the temperature 5 of the battery pack during the time duration 8 changes. The purpose of this change over time is to thermally condition the battery pack of the vehicle 4. In this example, the temperature 5 of the battery pack of the vehicle 4 is reduced. The purpose of this reduction in temperature is to optimize the charging speed of the battery pack of the vehicle 4 when the vehicle 4 reaches the charging station as indicated at point 6. It has been observed that the charging time necessary for charging the battery pack of the vehicle 4 can be reduced if the battery pack of the vehicle 4 has been thermally conditioned. In this example, the thermal conditioning for faster charging requires lowering the temperature of the battery pack, but it should be understood that the thermal conditioning for faster charging could involve increasing the temperature of the battery pack. Either way, the purpose of this thermal conditioning is to reduce the overall time it takes to charge the battery pack of the vehicle.

The thermal conditioning of the battery pack of the vehicle occurs at least in part during the time duration 8. Time duration 8 is a time period during which, vehicle 4 is traveling to the charging station. As will be explained in the paragraphs that follow, the system and method for thermally conditioning the battery pack involves an algorithm that specifies when the battery pack of the vehicle 4 should be charged. After this is determined, the thermal conditioning system of battery pack begins performing its task so that the battery pack is at a desired temperature 7 when reaching the charging station. The thermal conditioning of the battery pack is chemistry dependent. In one example, the battery pack may be chilled by 35° C. during time duration 8. However, instead of cooling the battery pack, the battery pack may be heated to reach a desired temperature to more quickly charge the battery pack.

As such, the battery pack of the vehicle 4 can be thermally conditioned for faster charging while the vehicle 4 is traveling to the charging station. By so doing, the battery pack is at the appropriate temperature upon arriving at the charging station. Prior art solutions did not perform this thermal conditioning until after the vehicle had reached the charging station, causing longer charging times, and hence resulting in user dissatisfaction.

Figure 2:
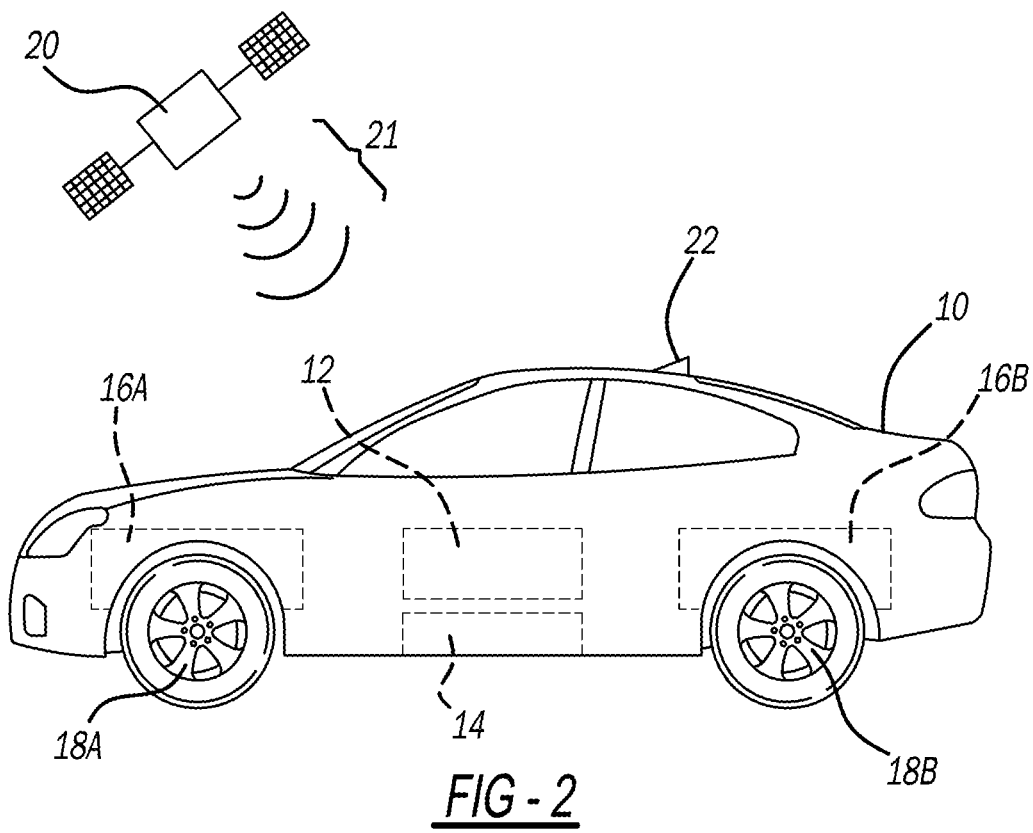
FIG. 2 illustrates a vehicle incorporating the system for thermally conditioning a battery pack of the vehicle.

Referring to FIG. 2, one example of a system for thermally conditioning at least one battery pack having one or more cells of an electric vehicle is shown. Here, a vehicle 10 includes a system 12 for thermally conditioning at least one battery pack 14 of the vehicle 10. At the outset, it should be understood that the vehicle 10 could be any one of a number of different vehicles that transport persons or objects from one location to another. As such, the vehicle 10 could be an automobile as shown, but could be any different type of vehicle including a light-duty truck, heavy-duty truck, tractor-trailer, mining vehicle, construction vehicle, tractor, military vehicle, and the like.

The vehicle 10 may be a plug-in electric vehicle ("PEV"), which is any motor vehicle that can be recharged from any external source of electricity, such as wall sockets, and the electricity stored in the battery pack 14 drives or contributes to drive the wheels. PEV is a subcategory of electric vehicles that includes all-electric or battery electric vehicles ("BEVs"), plug-in hybrid vehicles, ("PHEVs"), and electric vehicle conversions of hybrid electric vehicles and conventional internal combustion engine vehicles.

It should be understood that the vehicle may not be limited to only wheeled vehicles but could include vehicles that utilize treads or other physical implements to travel from one location to another. Expanding More on this, the vehicle 10 may not be limited to vehicles that travel on land but could include vehicles that travel on the water or in the air, such as boats, planes, and the like. Again, it should be understood that the vehicle can be any type of vehicle that transports persons or objects from one point to another.

As stated previously, the vehicle 10 includes a battery pack 14 that may be a single battery or may be a collection of batteries that have been electrically connected together. Each battery may include one or more electrochemical cells that store energy. The purpose of the battery pack 14 is to power the vehicle 10 and allow the vehicle to travel from one location to another. In this example, the battery pack 14 is connected to electric motors 16A and 16B. The electric motors 16A and 16B are capable of driving the front wheels 18A and back wheels 18B of the vehicle 10, respectively.

In this example, 16A and 16B act as the prime mover for driving the front wheels 18A and back wheels 18B of the vehicle 10. However, it should be understood that the vehicle 10 may only have one electric motor to drive the wheels 18A and/or 18B or could, in an alternative configuration, supplement a traditional internal combustion type engine that relies on the use of a combustible gas and/or liquid, such as a PHEV.

As stated before, the battery pack 14 may be a single battery or may be a collection of batteries electrically connected to each other to form a battery pack. Each of the batteries may include a plurality of cells. The battery pack 14 may be a lithium-ion battery pack, or any other type of battery pack that is capable of storing electricity. As such, other types of battery technologies may be contemplated and utilized and this invention is not limited solely to lithium-ion type battery packs.

The vehicle 10 may include a vehicle location system that may be part of the system 12 or may be separated from the system 12. As will be explained in greater detail in later parts of this description, the vehicle location system utilizes a map database and external information, including signals 21 from one or more global positioning system ("GPS") satellites 20 that are received by antenna 22 of the vehicle 10. The vehicle location system is able to utilize the information encoded in the signals 21 from the GPS satellites 20 along with a map database to determine the location of the vehicle. In addition to determining location, the system may be able to determine the location of one or more charging stations that are capable of charging the battery pack 14 of the vehicle 10. Again, more information regarding the system will be described later in this description.

Figure 3:
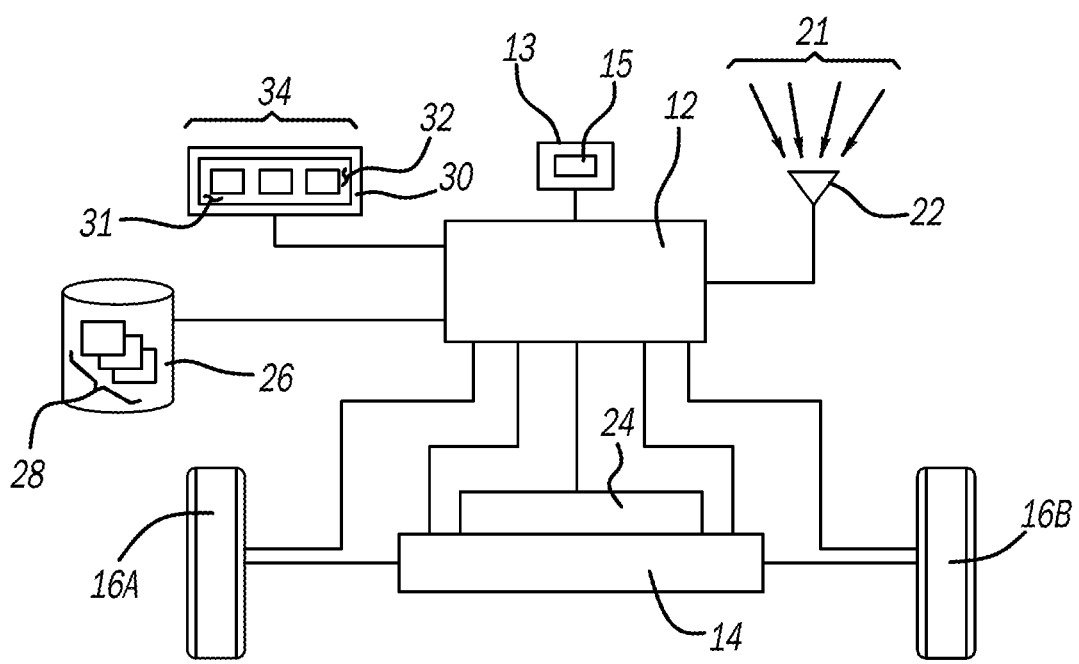
FIG. 3 illustrates a more detailed view of the system for thermally conditioning the battery pack of the vehicle.

Referring to FIG. 3, a more detailed view of the system 12 and some other components of the vehicle 10 are shown. As previously described, the system 12 is connected to one or more batteries 14 that provide energy to the motors 16A and/or 16B. The system 12 may be in electrical communication with a memory unit 13 that contains instructions 15 for configuring the system 12 to perform any one of a number of different methods disclosed in this description. The system 12 may include one or more processors that are configured by the instructions 15 stored in the memory unit 13 to perform any of the methodologies disclosed in this description. It should be understood that the system 12 and the memory unit 13 may take any one of a number of different suitable forms. For example, the memory unit 13 is incorporated within the one or more processors that make up the system 12. In another example, the system 12 may be a collection of application-specific integrated circuits.

FIG. 2 shows a thermal conditioning system 24 that is in thermal communication with the battery pack 14. The purpose of the thermal conditioning system is to heat and/or cool the one or more batteries forming the battery pack 14 of the vehicle 10. Vehicles that utilize batteries, such as vehicle 10, have much stricter operating requirements, especially with regards to temperature, than internal combustion based vehicles. Moreover, thermal management of battery systems in electric vehicles is critical for maintaining energy storage capacity, driving range, cell longevity, and system safety. Excessively high temperature of the battery pack 14 when it is charged can result in degraded performance, shorter driving range, useful life reduction, and can inhibit the ability to recharge the battery pack 14.

These issues of recharging become more problematic when higher capacity charging stations are utilized. If the battery pack 14 of the vehicle is not at an appropriate temperature, the amount of time it takes to charge the battery pack 14 can be impacted due to the need to reduce charge power. Moreover, higher capacity charging stations, sometimes referred to as fast charging stations which may deliver 40 kW or more charging power, may cause the temperature of the battery pack 14 to rise significantly. Without properly thermally conditioning the battery pack 14 beforehand, the amount of time it takes to charge the battery pack 14 may be lengthened and/or the battery life of the battery pack 14 may be compromised. Higher temperatures generally impact the charge power which causes a longer charging time. Conversely, if the temperature of the battery pack 14 is not high enough during fast charging, charge power will have to be reduced before the battery temperature reaches the desired range.

The thermal conditioning system 24 may utilize a fluid and multiple pipes that travel through the battery pack 14 to heat and/or cool the cells forming the battery pack 14. The thermal conditioning system heats and/or cools the fluid to an appropriate temperature to change the temperature of the battery pack 14 to a desired temperature. As stated before, it is generally desirable during charging situations to thermally condition the battery pack 14 to enhance the speed in which the battery pack 14 may be charged as well as extending the life of the battery pack 14.

Still referring to FIG. 3, the system 12 is connected to antenna 22 which, as described earlier, receives signals 21 from one or more satellites 20. These satellites may be GPS satellites but could be any type of global navigation satellite system ("GNSS"), such as Galileo, Beidou, and/or GLONASS. Regardless of what system is utilized, these signals contain encoded information that the system 12 can utilize to determine the location of the vehicle 10. In addition, the system 12 is in communication with a map database 26. The map database 26 includes map data 28. This map data 28 may be an electronic map and may include one or more points of interest ("POIs"). As such, the map data 28 is essentially electronic map that, among other things, contains information regarding POIs, such as gas stations, fast charging stations, hospitals, post offices, restaurants, and the like.

The system 12, when receiving the information from the satellites 20 and utilizing the map database 26, can determine the location of the vehicle 10 on the electronic map of the map database 26. Because the system 12 can determine the location of the vehicle 10 on the electronic map of the map database 26, the system 12 can determine the distance to, as well as a route, to one or more electric charging stations to charge the battery pack 14 of the vehicle 10.

An input/output device 30 may be connected to the system 12. Here, the device 30 may include a display area 31 to display visual information to an operator of the vehicle 10. The device 30 may be configured such that it includes a touchscreen 32 to allow the operator of the vehicle 10 to provide input into the device 30 and relay this input to the system 12. Here, in this example, the device 30 displays one or more icons 34. These one or more icons 34 could represent one or more choices of different POIs, such as electric vehicle charging stations, to the operator of the vehicle 10. If the operator of the vehicle 10 selects one of these icons 34, the system 12 will determine a route to the selected POI.

Figure 4:
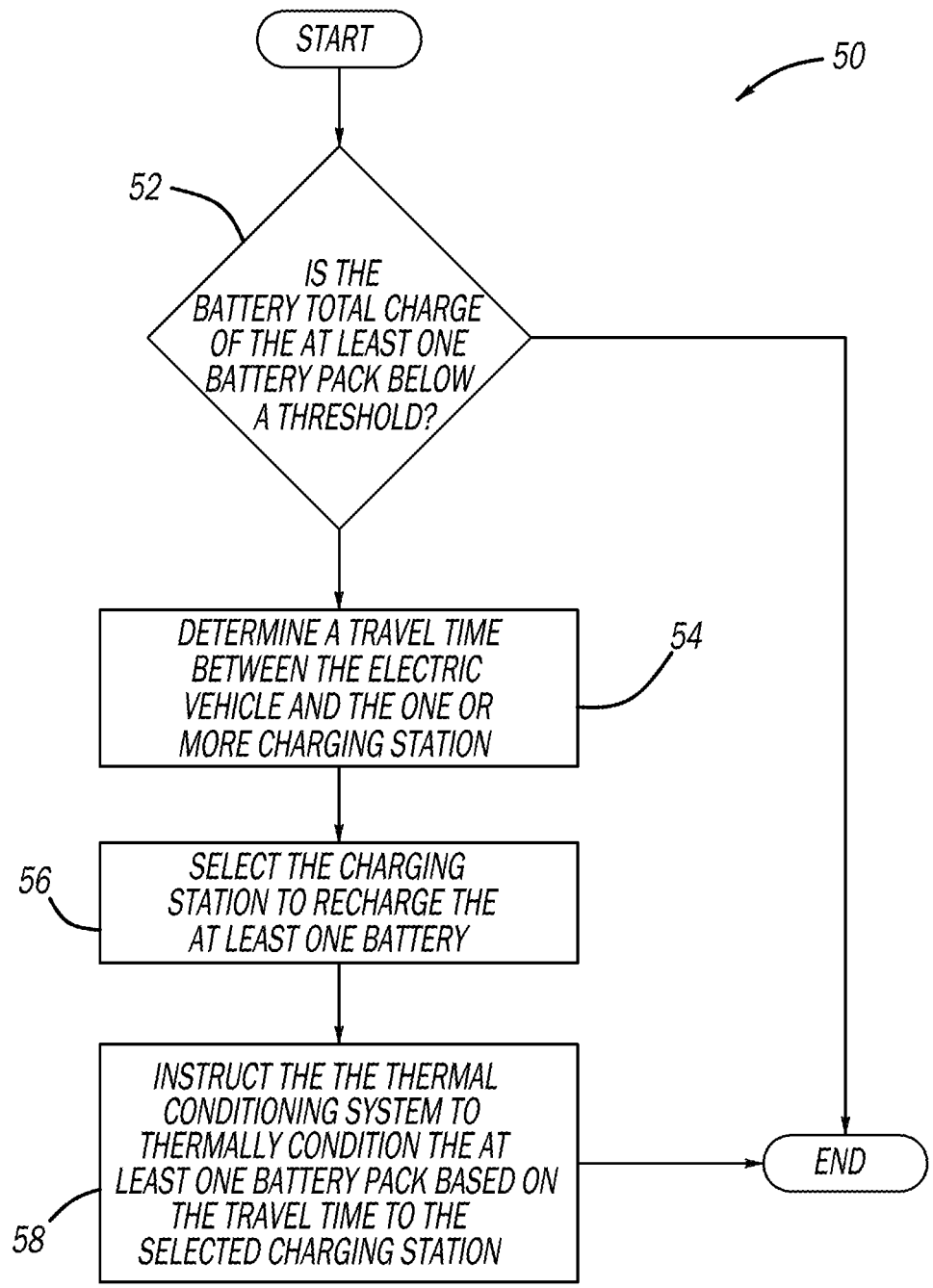
FIG. 4 illustrates a method for thermally conditioning the battery pack of the vehicle.

Referring to FIG. 4, a description of a method 50 for thermally conditioning the battery pack 14 of the electric vehicle 10 will be described. When describing the steps shown in the method 50 of FIG. 4, reference may be made to elements shown in FIGS. 2 and 3.

In step 52, the system 12 decides if the battery total charge of the at least one battery pack 14 is below a certain threshold. It should be understood that "battery total charge" could be based on a number of different measurements. For example, battery total charge could be a state of charge of the battery pack 14. As it is known to those skilled in the art, the state of charge is defined as the available capacity of the battery pack expressed as a percentage of some reference. The reference may be the battery pack's rated capacity but the reference could be the battery pack's current capacity. For example, a 100-kilowatt hour ("kWh") battery pack at 80% state of charge has 80 kWh of energy remaining. Over time, the capacity of this battery pack may decline. So, over a few years, the capacity of this 100 kWh battery pack may decline to 75 kWh. As such, 80% of the state of charge would refer to 60 kWh of energy. While the term kWh is mentioned as the unit of measure, battery pack capacity could be expressed as ampere-hours ("A·h") which is the amount of electrical energy present in the battery pack that allows one unit of current to flow for one hour.

This threshold could be indicative that the at least one battery pack 14 should be charged. As such, this threshold can vary, but generally indicates a threshold where the battery total charge of the battery is such that it would be advisable for the battery pack 14 to be charged or the operator of the vehicle 10 could be placed in the unpleasant situation of having not enough charge in the battery pack 14 to reach their destination.

As such, the system 12, when determining an appropriate threshold, may look at not only the battery total charge of the battery of the vehicle, but other factors such as the distance to an intended location, current battery temperature, rate of drain of the battery pack 14, and other factors. The rate of drain of the battery pack 14 could include such factors such as windshield wiper use, air conditioning use, radio use, headlight use, and the like. However, in a much simpler implementation, the threshold may simply be a charge ratio of the battery pack 14.

Furthermore, certain algorithms may be utilized to assist the system 12 in determining an appropriate threshold for indicating that the battery pack 14 should be charged. For example, the system 12 may utilize other factors such as considering the operator's home as a charging station, past charging ratios (i.e. when the operator determined that the vehicle should be charged), charging stations frequently utilized by the operator, proximity to certain activities, such as home, work, shopping, and other social activities. Prices for charging a vehicle at certain charging stations could be utilized in determining when and/or where the electric vehicle 10 should be charged.

Alternatively or additionally, other factors may be utilized as well. For example, the system 12 may determine whether the vehicle 10 is operating in a local mode or a travel mode. A local mode is generally an environment in which the vehicle 10 is operating in an area that is near the home, work, or other routine destinations or locations commonly traveled by the vehicle 10. In one such implementation, if the operator's home is a charging station, the system 12 may make an assumption that if the vehicle 10 can make it back to home, the operator will charge at home.

Additionally, if the vehicle 10 is determined to be operating in the local mode, the past charge ratio may be utilized. The charge ratio is essentially the amount of charge remaining on the battery pack 14 right before the battery pack 14 was charged. In one example, the system 12 may look at multiple charge ratios in order to determine the appropriate charge ratio to use as a threshold charge ratio. In one example, the system 12 takes some or all of the charges of the battery when the operator has charged, then average the charge ratios of the battery to indicate the operator's habit. This average charge ratio can then be utilized as the threshold, wherein when the vehicle reaches this average charge ratio, the system 12 will determine that it is time for the battery pack 14 to be charged.

Frequented stations may be weighted strongly. It has generally been observed that operators typically go to familiar places to refuel, so the same concept should apply here. The system 12 may implement algorithms that take into account that operators of vehicles 10 generally try to refuel close to their destination or start point. Other factors may be utilized, such that operators of the vehicle 10 generally do not want to go out and charge the vehicle 10 if the weather is poor, so ambient temperature or windshield wipers' or other information regarding the weather could be utilized to determine best when and where a vehicle should be charged.

A travel mode is when the vehicle 10 is operating outside of its home area. Travel mode will just see if the vehicle 10 is low on charge (some preset threshold, such as the average charge ratio previously described), the proximity of a charging station to the route, and price of electricity, if applicable. Generally, the travel mode is used when the driver is driving far from a familiar area.

Whether using the travel mode or the local mode, the system 12 generally assigns different weights to different factors to determine a value. A possibility is to assign weights to varying weight combinations for the factors and depending on which weight combinations produce the right result, increasing the weights for those weight combinations.

In the event that in step 52 that the battery total charge is not below a certain threshold, the method 50 may either end as shown or may start again from the beginning. By starting again from the beginning, the method 50 is essentially monitoring the battery total charge of the at least one battery pack 14 to determine if it drops below a certain threshold. If so, instead of ending, the method would move to step 54.

In step 54, the system 12 determines a travel time between the electric vehicle and one or more charging stations. The travel time determines in this step may include the actual time it will take for the vehicle 10 to reach the one or more charging stations and/or may include the distance between the vehicle 10 and the one or more charging stations.

In step 56, the system 12 selects the charging station to recharge the at least one battery pack 14 of the vehicle 10. The selection of this charging station may be made by the operator when the operator selects an icon 34 of the input/output device 30. The icon 34 could be a representation of the charging station and, when selected by the operator of the vehicle 10, the system 12 then begins to route the vehicle 10 to the selected charging station and determines the distance to the charging station and/or the travel time to reach a charging station.

If the system 12 instead relies on one or more algorithms to determine the most desirable charging station, the system 12 may use any one of a number of different factors. For example, the system 12 may weigh the selection of the charging station based on the physical safety of the area in which the charging station is located. Generally, charging stations that are proximate to stores and buildings, such as government buildings and high-end stores and restaurants are generally viewed to be a safer area. Other information to determine which areas are considered safe could include historical crime rate data for certain areas, time of day, and popularity.

In addition to safety-related data, the system 12 could use traffic data, popularity, and distance in selecting a charging station for the vehicle 10 to charge at.

The system 12 may utilize different integer values that represent each of the factors described. Depending on the factor, like weights, the assigned integer will be given varying values. Higher positive values are assigned if the charging station is excellent in terms of that factor, such as proximity to a government building, popularity, and negative values such as traffic or construction on the route to the charging station. All the values may be combined to give a value that indicates whether the charging station is one the driver should charge at.

Once a charging station is selected, the method 50 continues to step 56. In step 56, the system 12 instructs the thermal conditioning system 24 to thermally condition the battery pack 14 on the travel time (or travel distance) to the selected charging station. As stated previously, thermally conditioning the vehicle before and/or during the charging of the vehicle can be advantageous because it can reduce the total time required to charge the battery pack 14 of the vehicle 10, and extend the useful life of the battery pack 14. Therefore, the system 12 measures the temperature of the battery pack 14, makes a calculation of generally when the battery pack 14 will be charged based on the distance or time travel to the charging location, and then begins thermal management of the battery pack 14 to bring the battery pack 14 to the most beneficial temperature if possible. This thermal management of the battery pack 14 may involve heating or cooling of the battery pack 14 and the cells located within the battery pack 14 by the thermal conditioning system 24.

It is important to note that the thermal conditioning of the battery pack 14 occurs while the vehicle 10 is traveling to the charging station and not merely after the vehicle has already arrived at this charging station. By thermally conditioning the battery pack 14 before the vehicle 10 reaches the charging station, the battery pack 14 can be charged more quickly, and the useful life of the battery pack 14 can be extended.

In an alternative example, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited example, implementations can include distributed processing, component/object distributed processing, and parallel processing. Alternatively, virtual computer system processing can be constructed to implement one or more of the methods or functionalities as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall include any medium that is capable of storing, encoding, or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system for thermally conditioning a battery pack of an electric vehicle, the system comprising:
   at least one battery pack mounted within the electric vehicle, the at least one battery pack having at least one cell;
   a circuitry in communication with the at least one battery pack, the circuitry configured to determine a battery total charge of the at least one battery pack;
   a thermal conditioning system in thermal communication with the at least one battery pack, the thermal conditioning system configured to heat or cool the at least one cell of the at least one battery pack, the thermal conditioning system being electrically controlled by the circuitry;
   a vehicle positioning system in communication with the circuitry configured to determine a location of the electric vehicle;
   a map database in communication with the circuitry, the map database having location information of one or more charging stations for charging the at least one battery pack of the electric vehicle;
   wherein the circuitry is configured to determine when the battery total charge of the at least one battery pack is below a threshold, the threshold indicating that the at least one battery pack should be charged;
   wherein the circuitry is configured to select one or more charging stations based on popularity and determine, when the electric vehicle is travelling, a travel time between the electric vehicle and the one or more charging stations by determining the location of the vehicle via the vehicle positioning system and the location information of the map database; and
   wherein the circuitry is configured to instruct the thermal conditioning system to thermally condition the at least one battery pack based on the travel time to the one or more charging stations to reduce a time needed to charge the at least one battery pack.

2. The system of claim 1, wherein the circuitry is configured to instruct the thermal conditioning system to thermally condition the at least one battery pack to reduce the time needed to charge the at least one battery pack before the electric vehicle reaches the at least one charging station.

3. The system of claim 1, wherein the thermal conditioning system thermally conditions the at least one battery pack based on the travel time to reduce the time needed to charge the at least one battery pack by cooling the at least one battery pack from a current temperature.

4. The system of claim 1, wherein the thermal conditioning system thermally conditions the at least one battery pack based on the travel time to the at least one charging station to reduce the time needed to charge the at least one battery pack by heating the at least one battery pack from a current temperature.

5. The system of claim 1, wherein the circuitry is configured to:
   determine a range of the electric vehicle based on the battery total charge;
   determine the one or more charging stations that are within the range of the electric vehicle;
   select one of the one or more charging stations that are within the range of the electric vehicle;
   determine the travel time to the selected charging station; and
   instruct the thermal conditioning system to thermally condition the at least one battery pack based on the travel time to the selected charging station to reduce the time needed to charge the at least one battery pack.

6. The system of claim 5, wherein the range of the electric vehicle considers energy used for propulsion of the electric vehicle.

7. The system of claim 1, wherein the one or more charging stations for charging the at least one battery pack of the electric vehicle is configured to deliver at least 40 kW charging power.

8. The system of claim 1, wherein the circuitry is configured to generate a desirability value for each of the one or more charging stations that are within the range of the electric vehicle.

9. The system of claim 8, wherein the desirability value is based on at least one of: a general safety of the one or more charging stations, traffic near the one or more charging stations, road condition to the one or more charging stations, and distance to the one or more charging stations.

10. A system for thermally conditioning a battery pack of an electric vehicle, the system comprising:
    at least one battery pack mounted within the electric vehicle, the at least one battery pack having at least one cell;
    a circuitry in communication with the at least one battery pack, the circuitry configured to determine a battery total charge of the at least one battery pack;
    a thermal conditioning system in thermal communication with the at least one battery pack, the thermal conditioning system configured to heat or cool the at least one cell of the at least one battery pack, the thermal conditioning system being electrically controlled by the circuitry;
    a vehicle positioning system in communication with the circuitry configured to determine a location of the electric vehicle;
    a map database in communication with the circuitry, the map database having location information of one or more charging stations for charging the at least one battery pack of the electric vehicle;
    wherein the circuitry is configured to determine when the battery total charge of the at least one battery pack is below a threshold, the threshold indicating that the at least one battery pack should be charged;
    wherein the circuitry is configured to determine, when the electric vehicle is travelling, a travel time between the electric vehicle and the one or more charging stations by determining the location of the vehicle via the vehicle positioning system and the location information of the map database;
    wherein the circuitry is configured to instruct the thermal conditioning system to thermally condition the at least one battery pack based on the travel time to the one or more charging stations to reduce a time needed to charge the at least one battery pack; and wherein the circuitry is configured to generate a value indicating a likelihood that a driver of the electric vehicle will stop to recharge at least one battery pack mounted within the electric vehicle.

11. The system of claim 10, wherein the value indicating a likelihood that the driver of the electric vehicle will stop to recharge at least one battery pack mounted within the electric vehicle is based on a plurality of factors.

12. The system of claim 11, wherein each of the plurality factors are weighted differently based on if the electric vehicle is in a local area or a travel area.

13. The system of claim 12, wherein when the electric vehicle is in the local area, the factors include proximity to home, past charge ratio, frequented charging stations, and weather.

14. The system of claim 13, wherein past charge ratio is determined by averaging previous charge ratios of the at least one battery pack at charging.

15. The system of claim 12, wherein when the electric vehicle is in the travel area, the factors include proximately to a route the electric vehicle is travelling upon and unit price of electricity for recharging the at least one battery pack of the electric vehicle.

* * * * *